Aug. 28, 1962 M. L. HEILIG 3,050,870
SENSORAMA SIMULATOR
Filed Jan. 10, 1961 8 Sheets-Sheet 1

INVENTOR
MORTON L. HEILIG
BY
Douglas M. Clarkson
ATTORNEY

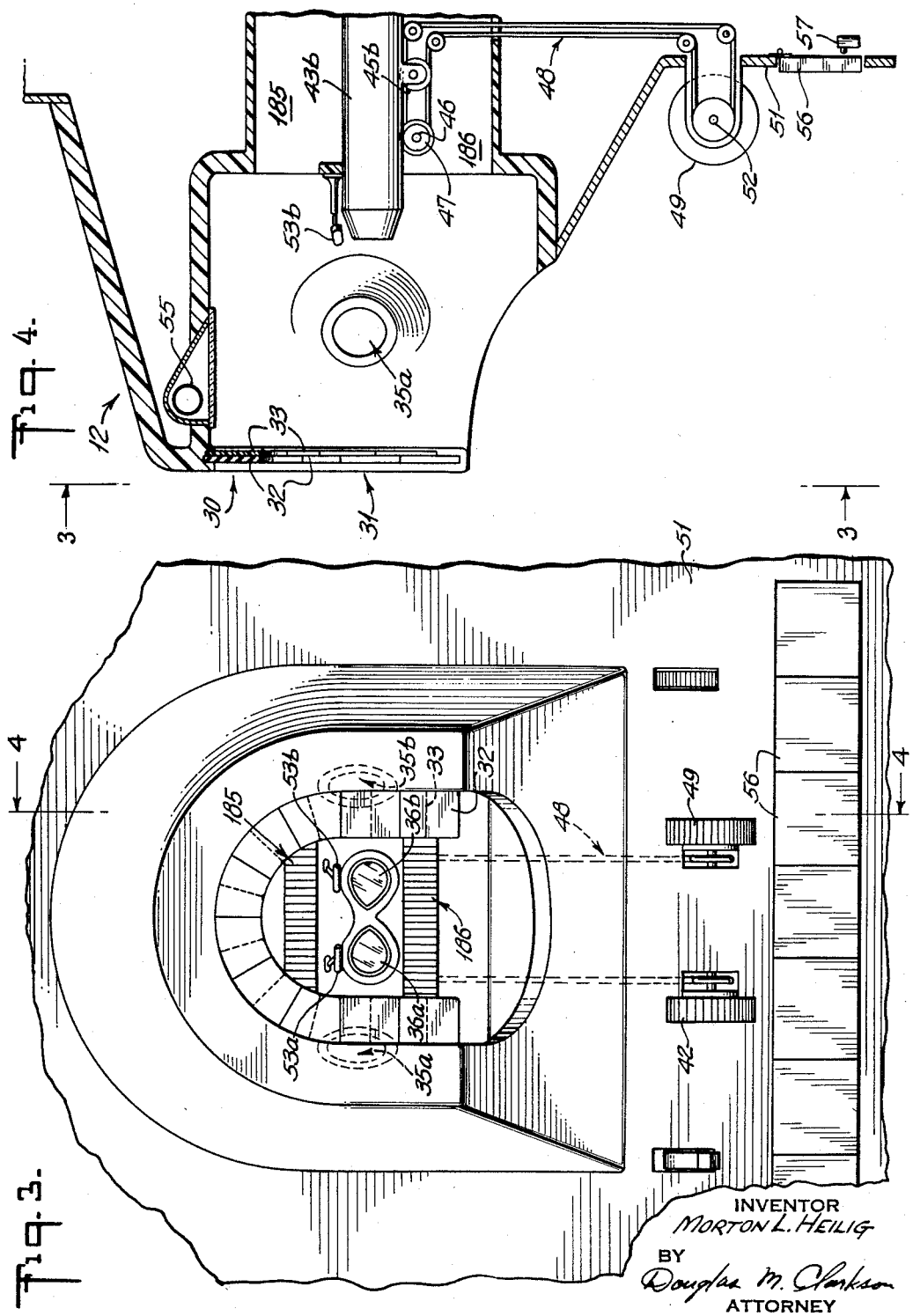

Aug. 28, 1962     M. L. HEILIG     3,050,870
SENSORAMA SIMULATOR

Filed Jan. 10, 1961     8 Sheets-Sheet 3

INVENTOR
MORTON L. HEILIG
BY
Douglas M. Clarkson
ATTORNEY

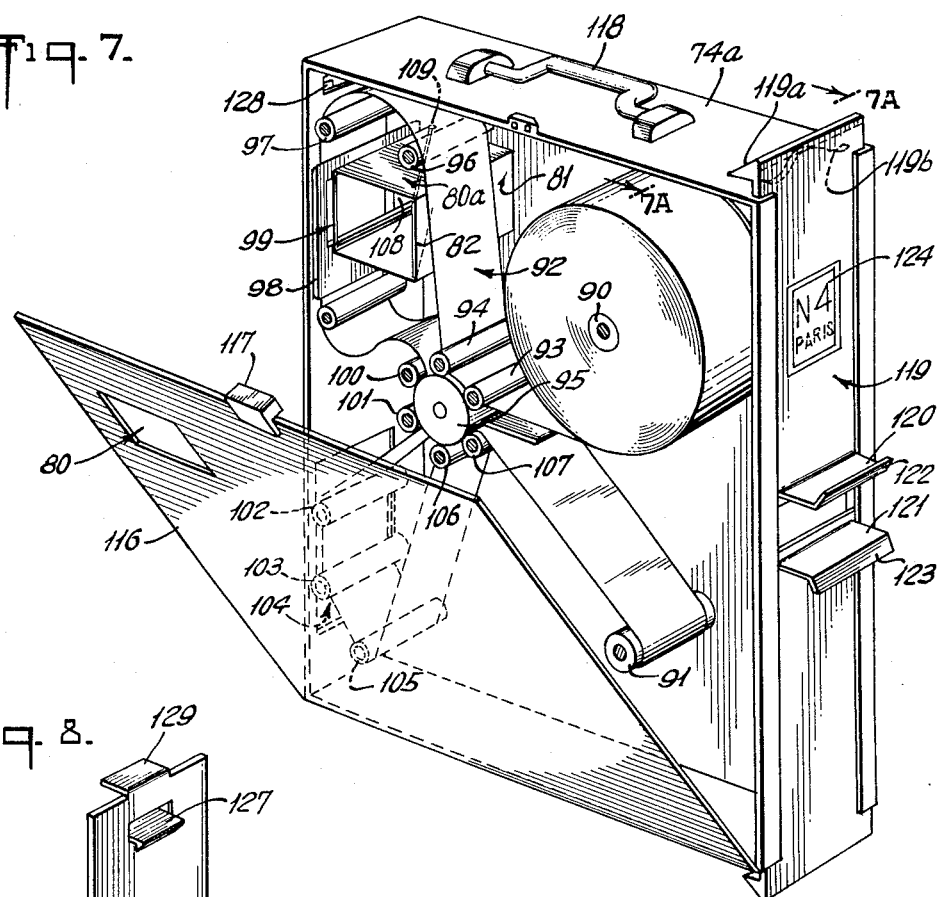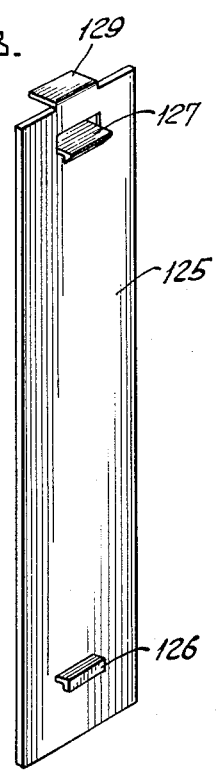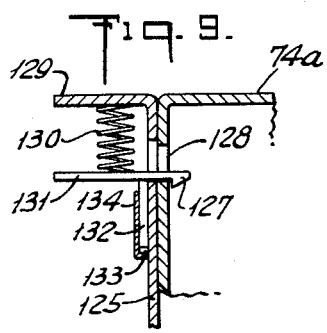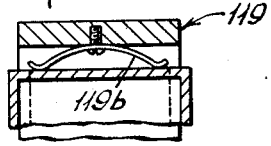

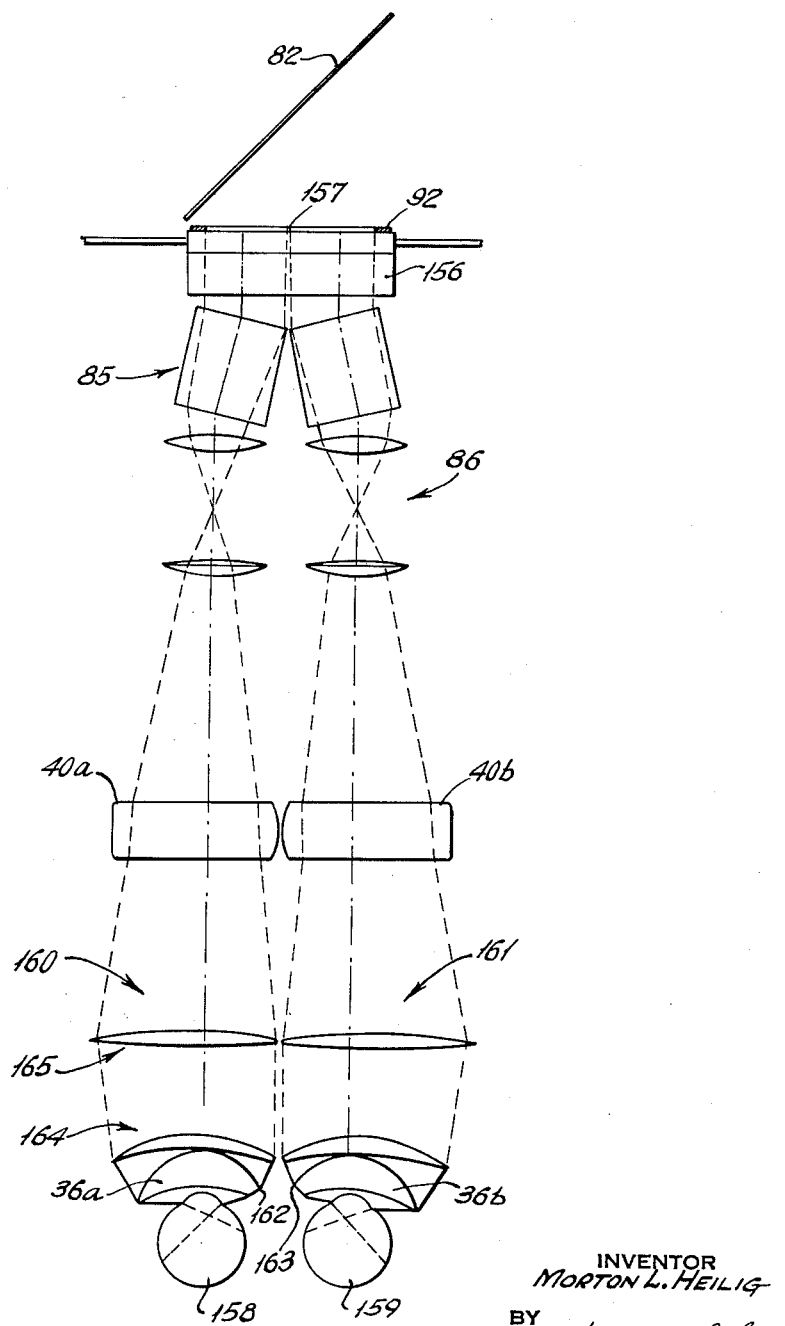

Aug. 28, 1962    M. L. HEILIG    3,050,870
SENSORAMA SIMULATOR

Filed Jan. 10, 1961    8 Sheets-Sheet 6

INVENTOR
MORTON L. HEILIG
BY
Douglas M. Clarkson
ATTORNEY

Aug. 28, 1962 M. L. HEILIG 3,050,870
SENSORAMA SIMULATOR
Filed Jan. 10, 1961 8 Sheets-Sheet 7

INVENTOR
MORTON L. HEILIG
BY
Douglas M. Clarkson
ATTORNEY

Aug. 28, 1962   M. L. HEILIG   3,050,870
SENSORAMA SIMULATOR
Filed Jan. 10, 1961   8 Sheets-Sheet 8

INVENTOR
MORTON L. HEILIG
BY Douglas M. Clarkson
ATTORNEY

United States Patent Office 3,050,870
Patented Aug. 28, 1962

3,050,870
SENSORAMA SIMULATOR
Morton L. Heilig, Long Beach, N.Y.
(10 Sheridan Square, New York 14, N.Y.)
Filed Jan. 10, 1961, Ser. No. 81,864
13 Claims. (Cl. 35—1)

The present invention, generally, relates to simulator apparatus and, more particularly, to apparatus to stimulate the senses of an individual to simulate an actual experience realistically.

There are increasing demands today for ways and means to teach and train individuals without actually subjecting the individuals to possible hazards of particular situations. For example, the armed services must instruct men in the operation and maintenance of extremely complicated and potentially dangerous equipment, and it is desirable to educate the men with the least possible danger to their lives and to possible damage to costly equipment.

Industry, on the other hand, is faced with a similar problem due to present day rapid rate of development of automatic machines. Here, too, it is desired to train a labor force without the accompanying risks.

The above outlined problem has arisen also in educational institutions due to such factors as increasingly complex subject matter being taught, larger groups of students and an inadequate number of teachers. As a result of this situation, there has developed an increased demand for teaching devices which will relieve, if not supplant, the teachers' burden.

Accordingly, it is an object of the present invention to provide an apparatus to simulate a desired experience by developing sensations in a plurality of the senses.

It is also an object of the invention to provide an apparatus for simulating an actual, predetermined experience in the senses of an individual.

A further object of the invention is to provide an apparatus for use by one or more persons to experience a simulated situation.

Another object of the invention is to provide a new and improved apparatus to develop realism in a simulated situation.

Briefly, an apparatus constructed in accordance with the principles of the invention embodies a housing having a hood means mounted thereon to fit about the head of an observer. A visual image projection means is supported by the housing, and an optical means is included to direct images from the projection means to the hood. In addition to the above, means is provided to direct a breeze toward this hood, and at least one odor-sense stimulating substance is positioned to be releasable into the breeze in response to a signal from a suitable coordinating means. It is the cooperative effects of the breeze, the odor, the visual images and binaural sound that stimulate a desired sensation in the senses of an observer. For those instances where a sense of motion is desired, means is provided to induce small vibrations or jolts to simulate movement and, also, to simulate actual impacts.

Other objects of the invention will be pointed out in the following description and claims and illustrated in the accompanying drawings, which disclose, by way of example, the principle of the invention and the best mode which has been contemplated of applying that principle.

In the drawings:

FIG. 3 is a front elevational view of the panel inside the hood as taken along the line 3—3 in FIG. 4;

FIG. 4 is a side view in elevation taken along the line 4—4 in FIG. 3;

FIG. 7 is a perspective view of one film container in accordance with the invention;

FIG. 7A is a view along the line 7A—7A in FIG. 7;

FIG. 8 is a perspective view of one end for the film container shown in FIG. 7;

FIG. 9 is a view in elevation and in section showing a clasp for the structure of FIG. 8;

FIG. 10 is a view of the optical arrangement in accordance with the invention;

Figure 1:
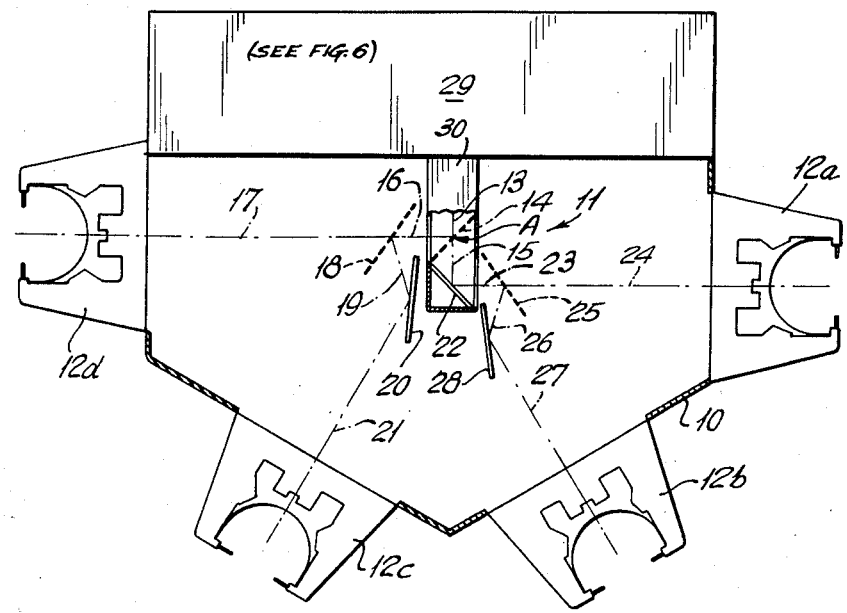
FIG. 1 is a top plan view of a hood arrangement for four viewers in accordance with the invention.

Before proceeding with a detailed description of the present invention, a somewhat detailed discussion of the setting in which the invention is cast is believed to be in order.

It is recognized generally that teaching by machine has at least two distinct advantages; (1) enables articulate, talened teachers to reach a greater audience, and (2) enables a subject to be clarified and dramatized to a greater extent than an unaided teacher is capable of doing. It is the great potential afforded by this second point that the present invention is adapted to be directed.

A basic concept in teaching is that a person will have a greater efficiency of learning if he can actually experience a situation as compared with merely reading about it or listening to a lecture. For example, more can be learned about flying a supersonic jet airplane by actually flying one, or a student would understand the structure of an atom better through visual aids than mere word descriptions. Therefore, if a student can experience a situation or an idea in about the same way that he experiences everyday life, it has been shown that he understands better and quicker, and if a student understands better and quicker, he is drawn to the subject matter with greater pleasure and enthusiasm. What the student learns in this manner he retains for a longer period of time.

Since it is either impossible or dangerous to give students life-like experiences, attempts have been made to bring them as close as possible to this ideal by utilizing, for example, photographs, records and motion picture films. However, even the motion picture films, the most realistic of these media, fall far short of conveying to the student the illusion of reality.

The training films which have been used at an early date provided visual movement that was confined to a small rectangle that fills only one-twelfth of the students' normal visual field. Its image is flat and two dimensional, whereas the normal student sees in three dimensions (including depth). Also, such prior training films presented no scents, tactile sensations or directional sound, which are an important part of one's perception of reality.

Realizing the above, many attempts have been made in the past to obtain more realism in training aids. In the late 1930's and early 1940's, with the support of the United States Air Force, "Cinerama" was developed. This is a motion picture system that filled approximately 40% of the viewers' peripheral field of vision with a two dimensional picture, and it employed five projectors to fill a screen shaped like a quartersphere. Directional sound was provided by five speakers located behind the screen at different spaced-apart points. Later, for its commercial debut in 1952, the five projectors and film strips were reduced to three, reducing the visual field to about 30%.

The three projectors mentioned above were separated behind the proscenium in such a way that the centers of their projected beams crossed at the focal point of the screen's curve. However, a serious disadvantage in Cinerama was the noticeable jiggling between each of its picture segments.

Another arrangement quite similar to Cinerama is one known as "Cinemiracle." This system uses three films and three projectors, but the projectors are located in one central booth rather than dispersed, and, like Cinerama, has the jiggling between picture segments.

In 1953 true 3-D movies (which had been invented some fifty years earlier) were introduced to the public. This system employs two cameras and two projectors, and, furthermore, requires a spectator to use Polaroid glasses in order to have the left eye image reach only the left eye and the right eye image reach only the right eye. Although this system does provide true 3-D, it is hampered seriously by the fact that only one-twelfth of a viewer's field of vision is used. Therefore, objects floating in space are disagreeably truncated by the picture's frame.

The next development is known as "Todd-A-O" which is a step forward over the above described arrangements in that the bothersome jiggling between the three sections of Cinerama was eliminated. This was accomplished by putting the entire picture on one piece of 70 mm. film through one large lens as compared with previous methods of using three separate lenses and three strips of 35 mm. film. However, the Todd-A-O development loses some of the sharpness which is characteristic of Cinerama and fills only 25% of the natural peripheral field of vision. In addition, it provides only a two dimensional image.

Following the above, Walt Disney introduced a system known as "Circarama." This is a system that uses eleven projectors to put a two dimensional picture on a ribbon-like screen that circles about the audience. However, there is no provision for the vertical field of vision of an audience, and it is plagued by extreme jiggling between each of its eleven frames and because the spectator gets dizzy turning around to see what is happening behind him.

The most recent developments in the trend toward realism include Walter Read's "Aromarama" and Mike Todd, Jr.'s "Scent-O-Vision." These add scents to a wide screen Cinemascope or Todd-A-O picture. With the Aromarama system, odors are injected into the theater's air conditioning system, and with the Scent-O-Vision system, odors are piped into the arms of the spectators' chairs. Both of these systems are anachronistic when used in conjunction with a two dimensional picture seen through the confines of the 25% window viewing area.

The Sensorama Simulator of the invention achieves a more complete illusion than the afore-mentioned systems without any of their defects through a novel approach. It accomplishes this by stimulating the nervous system with a wide variety of sensory stimuli in forms that are natural to it, i.e., color, visual movement, complete peripheral vision, 3-D, binaural sound, breezes, odor and tactile sensations.

In the device of the invention there are no problems of spherical distortion because the eyes of a viewer are always on the optical axis of the picture; this is impossible in all theater systems. No matter how severe the barrel distortion of the image is, everything looks straight to the viewer.

In addition to the above, there is no washing out of image contrast or color due to light bounding from one side of the screen to the other as it does on deeply curved theater screens, and since no Polaroid or colored glasses are necessary to achieve 3-D image separation, the color of the picture image is substantially pure. Also, since each eye sees only its own portion of each frame, greater sharpness is achieved with less film information than would be necessary if both eyes could focus on the details of the same picture as they do in "wide screen" theater systems.

The light source need only be sufficient to permit a person or persons close thereto to view the film, a much less amount of light is required, and there are no heat or film buckle problems that plague the theater systems.

Substantially perfect directional sound is achieved by using only two recording microphones and two playback tracks. Approximately twenty microphones, tracks and speakers would be required to achieve a comparable directional effect in a theater system. A still further advantage of the invention is provided by the scent arrangement. Scents can be given and removed with greater precision since only the air near the viewer's nose is involved. Other systems require the movement of large volumes of air, which necessarily means a time lag and overlap of one scent with another and much larger and costlier ventilation equipment is needed.

The invention provides other advantages. The cost of a device in accordance with the invention is only a few thousand dollars as contrasted with the millions required heretofore for actual life-size physical mock-up simulators which in many ways are not as effective or versatile as the simulator provided by the present invention. The device of the invention, therefore, can be produced and used in large numbers. It is a physically small unit that can be transported and installed at any desired location.

Since the device of the invention is a "natural environment simulator" rather than a synthetic environment simulator, it can be used to create any environment desired (from realistic to abstract) and can be changed quickly from one program to another. As a consequence of this flexibility and naturalness, the device of the invention is capable of giving an environment all of the emotional color and intensity that a spectator or trainee would experience in real life situations.

The device of the invention also is adapted to provide privacy for the viewer. Even if a viewer is experiencing a very quiet scene, he is in no way distracted by the lights and noise of the room about him. The converse is also true. The viewing of a scene in no way disturbs the people around it, no matter how noisy the scene inside the machine may become. Therefore, several of the machines can be operating in the same room at the same time. The apparatus also can be installed in classrooms, laboratories, business offices, recreational centers, etc., without in any way disturbing the normal activities of the place. No conventional film or television projection can do this.

The present invention now provides a completely new approach to the overall problem of realism. FIGURE 1 of the drawings shows a plan view of an "individualized" apparatus, as contrasted with the theater concept which accommodates a large number of people. Although any number of individual persons may participate in the use of an apparatus in accordance with the invention when the apparatus is constructed to accommodate that number of persons, the form of the apparatus illustrated in FIGURE 1 is constructed specifically for one to four persons.

As seen in FIGURE 1, an enclosure 10 surrounds an optical system (to be described in greater detail presently) of which a reflector arrangement 11 is a portion. It is preferred that the enclosure 10 be substantially light-tight and, in this connection, the inner surfaces of the enclosure 10 are blackened to minimize light reflections.

Individual hoods or canopies 12a, 12b, 12c and 12d are positioned conveniently about the enclosure 10 so that from one to four persons may be accommodated at one time. A picture to be viewed is transmitted along an optical axis 13 to a semi-reflective surface 14, indicated generally by the dotted line in FIGURE 1.

The semi-reflective surface 14 permits the picture to be viewed simultaneously along an axis 15 and an axis 16. A person at the canopy 12d will view the picture along an axis 17, which is a continuation of the axis 16 passing through a semi-reflective surface 18 similar to the surface 14. The picture being transmitted along the axis 16 is reflected also by the surface 18 to be directed along an axis 19 to a reflector surface 20 for viewing along an axis 21 by a person at the canopy 12c.

A reflector surface 22 reflects the picture from the axis 15 to an axis 23 from which a person at the canopy 12a views the picture along an axis 24, forming a continuation of the axis 23. The picture being transmitted along the axis 23 passes through a semi-reflective surface 25, similar to the surfaces 14 and 18, and also is reflected by the surface 25 for transmission along an axis 26. From the axis 26, the picture is reflected to an axis 27 by a reflector surface 28 for viewing by a person at the canopy 12b.

Any one or all of the canopies 12a to 12d, therefore, receive a picture which is transmitted initially along the single axis 13 from a film storage compartment 29, the details of which will be described hereinafter. Interference between the respective picture transmitting axes is prevented by supporting the surfaces 14 and 22 in a suitable housing 30 or other structure to block unwanted light.

In the receipt of the same picture at all of the canopies 12a to 12d, an important consideration to be appreciated is that the focus of the picture image must be maintained for each canopy. This is accomplished with the reflector arrangement 11 by ensuring that the lineal distance from the point A is the same along each respective optical path. Since the distance from the film in the compartment 29 along the axis 13 to the point A is the same for each canopy, this distance presents no problem. However, the positions of the reflector surfaces must be selected carefully so that, by way of example, the length of the axis 16 plus the length of the axis 17 must equal the length of the axis 16 plus axes 19 and 21. The optical distances from the point A to the canopies 12a and 12b are traced in the same manner and must be equal to the optical distance to the canopies 12c and 12d mentioned above.

Since each canopy is substantially identical to the others, the structural details of only one canopy will now be presented to simplify the description, and the numeral 12 will be used generally to identify the canopy.

Figure 2:
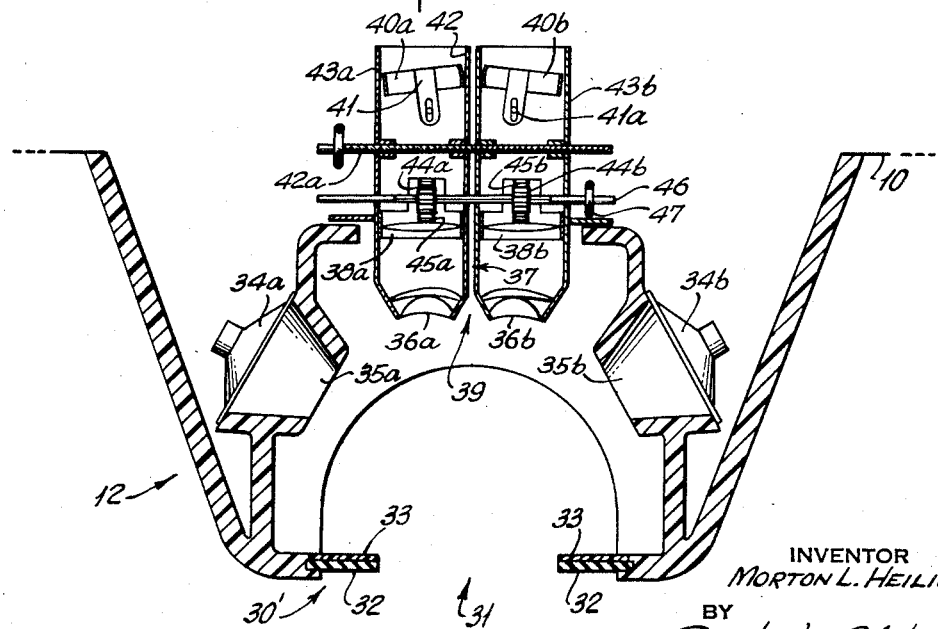
FIG. 2 is an enlarged plan view of only one of the hoods shown in FIG. 1.

Referring now to FIG. 2 of the drawings, a plan view of the canopy 12 is shown partly in cross section. The back 30' of the canopy 12, i.e., that portion which would be behind a person's head, is provided with an opening 31 to permit access to the space within the canopy 12 without requiring a person to stoop.

Access is simplified further by a plurality of outer flaps 32 and a plurality of inner flaps 33 supported about the perimeter of the opening 31. As illustrated better in FIG. 3, the flaps 32 and 33 are staggered so that each crack or space between adjacent flaps in, for example, the outer plurality is covered by one of the flaps of the other plurality, for example the inner plurality.

In addition, the flaps of each plurality 32 and 33 are dimensioned suitably to permit flexibility so that a person may insert his head easily through the opening 31, and yet, the flaps should be long enough in the direction directly away from the perimeter to close sufficiently behind his head to prevent light from interfering with the picture being viewed. For this purpose, a suitable material from which to form the flaps 32 and 33 would be rubber, plastic, etc.

Similarly, the canopy 12 itself may be formed of rubber, plastic, etc., but whatever material is selected, it must be substantially rigid structurally to support itself and the various component parts of the apparatus, and preferably, the apparatus should be formed of a material that is non-conductive electrically to minimize the chance of harmful electric shocks.

On opposite sides of the canopy 12, speakers 34a and 34b are supported in cavities 35a and 35b, respectively. Each of the speakers is tilted slightly rearwardly, and if desired, the speakers are excited stereophonically to create more realistic audio stimulations for a person using the apparatus.

A lenses system, to be described in greater detail presently, terminates in eye pieces 36a and 36b in the canopy 12. It should be noted that the space 37 between the lenses for each eye is relatively small and that the tubular housings 43a and 43b are flared outwardly at sides of the ends which are adjacent each other to provide a space 39 to receive the nose of a viewer, as will be made clearer hereinafter.

The lens housings 43a and 43b are movable laterally relative to each other, and the lateral adjustment (interocular distance) of a picture image for each eye of a viewer is obtained by lenses 40a and 40b. Each of these lenses is supported in a frame 41 which is pivotable on a fixed axis 41a. By turning a knob 42 (FIG. 3), a shaft 42a (FIG. 2) is turned, and the lens housings 43a and 43b are moved laterally. The shaft 42a is threaded in opposite directions from the center outwardly so that the lens housings move laterally in opposite directions, and since each axis 41a is fixed in position, the lenses 40a and 40b are tilted relative to each other by the lateral movement of their respective housings. This also will be referred to again in more detail in the description to follow concerning the complete lens system.

A focus adjustment for the optical system is seen in FIGS. 2, 3 and 4. A portion of each lens housings 43a and 43b is movable axially relative to their length. For example, both of the housings 43a and 43b are somewhat tubular and both of these housings are fixed in position, but a pair of lens supports 38a and 38b are movable axially in the respective housings 43a and 43b.

Two gears 44a and 44b are supported to mesh with cooperating gear racks 45a and 45b fixed to the movable lens supports 38a and 38b, respectively. An axle 46, common to the two gears 44a and 44b, has a pulley 47 attached thereto, and a suitable belt 48 (FIG. 4) connects the pulley 47 with a knob 49.

Preferably, both of the knobs 42 and 49 are supported so that they can be gripped substantially entirely within the palm of the hand of a person to permit small adjustments in the interocular distance and the focus of the lenses system. While the knobs 42 and 49 are shown supported in a plane substantially perpendicular to the front 51, they may be supported in a plane substantially parallel with the front 51, if desired, the preferred feature being that the knobs 42 and 49 are fully exposed for greater ease in grasping in the hand of a user.

Also, it will be understood that while a flexible belt 48 is shown for illustrative purposes, any other suitable interconnection means such as gears and/or levers may be substituted therefor, if desired.

As best seen in FIGS. 3 and 4, two relatively small brow pads 53a and 53b are provided just above the lenses eye pieces 36a and 36b, respectively, so that the head of an observer may be positioned correctly and comfortably during use of the apparatus. Each brow pad is a relatively thick, soft cushion so that with the forehead of an observer comfortably supported, the observer's eyes are relatively close to the lenses eye pieces 36a and 36b.

The positioning of the eyes of an observer is important since a unique lenses system is provided to achieve an unusually wide visual range. Therefore, the brow pads must permit any observer to position his head correctly and comfortably. In this connection, such features as ball sockets and spring mountings may be used if desired, to allow for some variations in head size and shape between observers.

Located somewhere within each canopy 12 but preferably in the top thereof is an ultraviolet lamp 55 (FIG. 4), which is provided for illumination and sterilization. Since the eyes of humans are not responsive to light in the ultraviolet range, suitable paint or other coatings of ultraviolet responsive materials may be placed on those portions within each canopy 12 which it may be desired to have more readily visible, such as the brow pads 53a and 53b. Also, it is preferred that the lamp 55 be located toward the rear of the canopy so that substantially the entire forward parts of the canopy are bathed in the light.

Suitable name plates 56 are on the front 51 (FIG. 3) of the device to identify the various subjects for which films are provided, and suitable electrical switches 57 (FIG. 4) are provided directly behind each respective plate 56 to select a desired subject. The selection feature of the invention will be referred to again in greater detail hereinafter.

Of course, in some instances and for some uses of the apparatus of the invention, such as when the apparatus is used as a training aid, the various subjects to be viewed may not be selected by the observed, but may be set up by an instructor or other individual who may simply insert a single desired film into the device at any one time or have the plate-switches 56—57 located externally of the apparatus. Therefore, it is intended that the device be adaptable to both selections made by a user and by another person as well.

Figure 5:
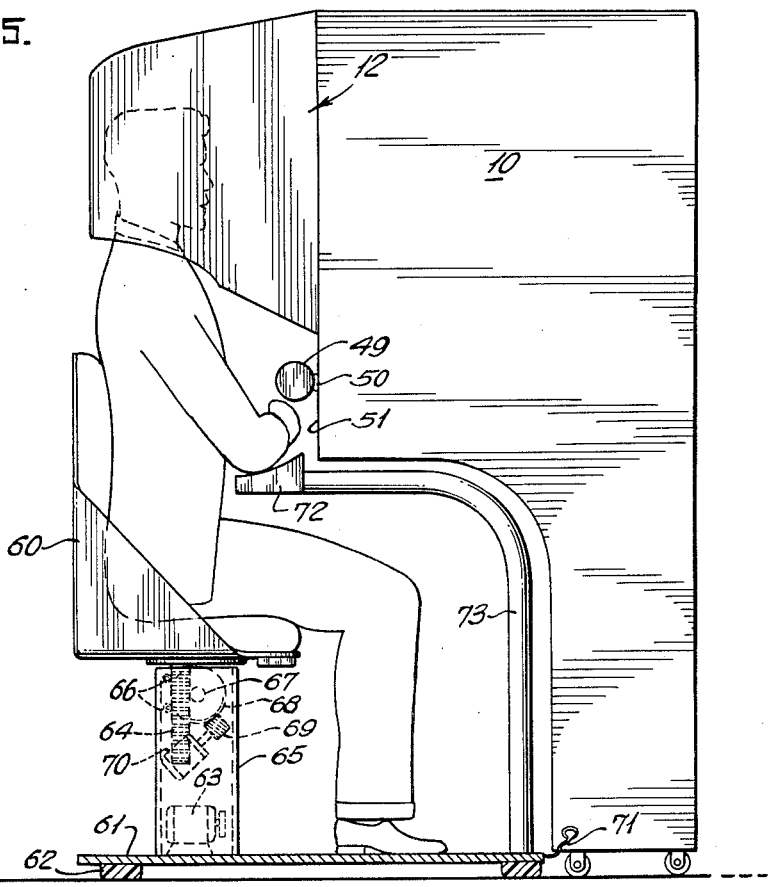
FIG. 5 is a side view in elevation similar to that shown in FIG. 4 but showing a seat, arm rest and controls.

Referring now to FIG. 5 of the drawings, a seat 60 is supported on a platform or base 61 which is separate from the enclosure 10, which base, in turn, is supported on relatively soft resilient pads 62. A vibrator unit 63 is fixedly attached to the platform 61 so that, upon energization, a vibration is induced in the seat 60, foot platform 61 and an arm rest 72.

It will be appreciated that vibrations of relatively small amplitude are sufficient to create illusions of reality during such scenes as a bobsled ride, a landing aircraft touching a runway, a train ride, etc. However, by suitable programming, the vibrations may be created unevenly and may also provide sensations of bumps or impacts.

Control for the vibrator unit 63 is, preferably, electrical and is initiated by electrical signals from a track on the film which is being viewed. A signal initiated at a preselected time and at preselected intervals may be amplified and used to close a relay (not shown) to actuate the vibrator unit 63. The provision of a suitable control for the vibrator unit 63, therefore, is believed to be within the skill of persons in this field.

The seat 60 is adjustable vertically to suit the requirements of various individuals. A center post 64 is attached at its uppermost end to the underside of the seat 60 and extends downwardly within a hollow block 65. Vertical support is obtained for the center post 64, and thus the seat 60, by a plurality of spaced apart idler gears 66 meshing with separate, circumferential grooves spaced apart vertically along the center post 64.

The idler gears 66 maintain the grooves in the center post 64 meshed with a small power gear 67 which is fixed to a rotatable shaft. Each of the idler gears 66 and the power gear 67 have teeth which are substantially the same pitch, which pitch is substantially that of the separate grooves in the center post 64.

Fixed to the same shaft with the small power gear 67 is an intermediate gear 68 which is larger and is meshed with a pinion gear 69. The pinion gear 69, in turn, is fixed to the shaft of a reversible motor 70. Therefore, the seat 60 is adjustable vertically by actuating the motor 70 and is rotatable due to the circular grooves in the center post 64.

A switch (not shown) to actuate the motor 70 may be located just under the edge of the seat 60 itself, or alternatively, such a switch may be located on the front panel 51 of the enclosure 10. An electrical connection 71 is shown in FIG. 5 between the platform 61 and the enclosure 10 to provide an electrical ground connection.

Also supported on the platform 61 is an arm rest 72 positioned appropriately adjacent the front 51 of the enclosure 10. A long, curved pipe 73 extends from the arm rest 72 at one end and is fixedly mounted on the platform 61 at its opposite end.

In view of the above described structure, it will be evident now that the seat 60, the foot rest (on the platform 61) and the arm rest 72 are structurally independent of the main enclosure 10. This arrangement also is separate and independent for each of the canopies that are associated with any one enclosure 10.

Figure 6:
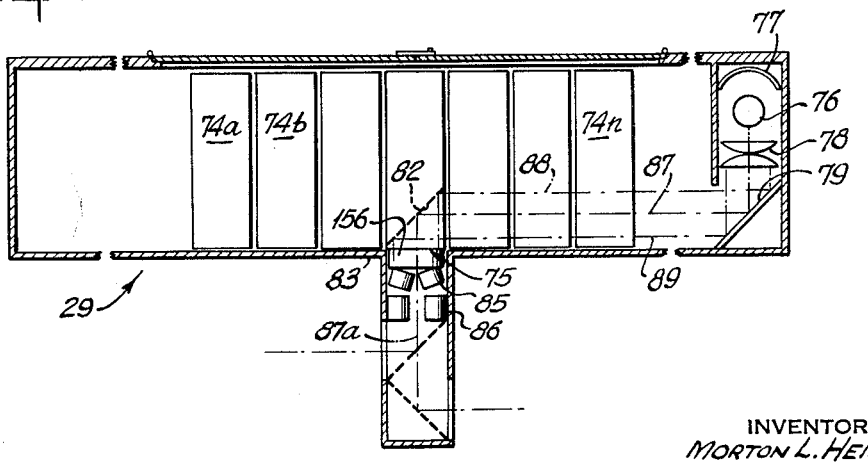
FIG. 6 shows a plan view of a plurality of films in position for selective viewing by one or more persons.

The film storage compartment, identified generally in FIG. 1 by the numeral 29, is shown in more detail in FIG. 6. A plurality of individual film magazines 74a, 74b, . . . 74n is supported so that they are movable laterally within the compartment 29 to position a preselected magazine before an opening 75. Any desired means may be used to move the magazines, such as for example, all of the magazines may be connected together and shifted laterally by a belt, chain, etc. connected to the magazine on each end; the magazines may be supported on a carriage or conveyor which is moved in either direction by an electric motor; or any other means within the skill and purview of a mechanic in the art.

A single light source 76 is located at one end of the compartment 29 in front of a reflector 77 so that light rays are directed through a pair of condensing lenses 78. From the lens 78, the light rays are reflected by a mirror surface 79 and are directed along the inside of the front wall of the compartment 29.

Each film magazine 74a, 74b . . . 74n has an opening 80 (FIG. 7) on one side and an opening 81 on the opposite side connected by a rectangular enclosure to permit light reflected by the mirror surface 79 to pass completely through. The purpose of the enclosure 80a is to prevent the film being exposed to dirt and other foreign objects through the openings 80 and 81. However, the forward wall of each enclosure has a light interrupter gate 82 (FIGS. 6 and 7) which is opened by a plunger 83 (FIG. 15) when a preselected film magazine is in position before the opening 75.

With a gate 82 open, light is reflected from its frosted surface, through a film, and into the reflector arrangement 11 to carry optical images to respective viewers. Suitable prismatic lenses 85 separate the two halves of each image slightly, and resolving lenses 86 reestablish any possible deviation from parallelism which the light rays may have developed.

The line 87 indicates, within the compartment 29, the center line of the light beam, and the lines 88 and 89 indicate the outer edges of the beam. Of course, the two halves of the beam are separated after passing through the film and the opening 75 so that the center line 87a is more of a diagrammatic illustration of the general direction for the separate two halves of the beam, the reason for which will be explained hereinafter.

Referring to one film magazine in detail as seen in FIG. 7, a film supply reel 90 is supported above a film take-up reel 91 in the magazine 74a, and a film 92 passes between guide rolls 93—94 and a central guide roll 95. Then, the film 92 is directed generally up over guide rolls 96—97, behind a plate 98 having an opening 99 therein. The guide rolls 96 and 97 are spaced from each other to ensure clearance between the film 92 and the enclosure 80a.

Continuing with the direction of travel of the film 92, the film is directed again to the central guide roll 95 and is held thereagainst by guide rolls 100 and 101. From there the film 92 passes over two rollers 102 and 103 which are spaced apart in front of an opening 104 in the magazine 74a. The film 92, then, is directed past a roll 105, up to guide rolls 106 and 107 adjacent the central guide roll 95 and is wound on the take-up reel 91.

The opening 99 permits light reflected by the gate 82 to pass through the film 92, and the opening 99 is sufficiently wide to provide a space 108 for the plunger 83 (FIG. 6) to pass through next to the film 92. When the plunger 83 moves against the gate 82, the gate 82 is pivoted inwardly on its hinge 109 against the action of a small spring (not visible) which closes the gate again when the plunger 83 is withdrawn.

The opening 104 is provided so that when a selected film magazine is in position for viewing, a mechanism (not shown) is advanced, such as by an electrical solenoid, to move open the gate 82, to engage a film pull-down attachment 156 (FIG. 15), to engage a power attachment 84 (FIG. 15), and to position a magnetic pick-up head 113 (FIG. 15) to "read" sound and reference signals stored in various tracks on the film. When this mechanism is in position as described above, rolls 111 and 112 act against the film 92 to force it tightly against the rolls 102 and 103.

Figure 15:
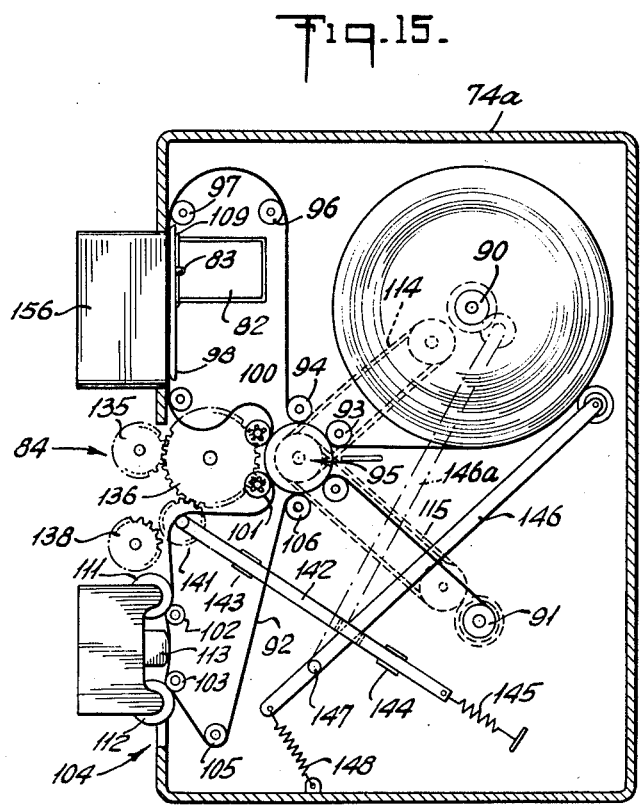
FIG. 15 is a side view in elevation of one film container as shown in FIG. 7 illustrating a rewind mechanism.

The film 92 is taut, preferably, between the rolls 101 and 102 since the only slack that is needed usually is adjacent the film pull-down mechanism 156. This is shown in FIG. 7, but the film may be looped between these rools 101 and 102 if desired, as shown in FIG. 15, this not being an essential feature of the apparatus.

The central guide roll 95 is connected to both the rolls 90 and 91 by suitable belts 114 and 115 (FIG. 15) so that both reels are turned in synchronism. Therefore, as the reel 90 is unwinding, the reel 91 is winding, and conversely the reel 91 will unwind in synchronism with the winding of the reel 90.

As will be seen in FIG. 7, a door 116 is hinged at the bottom of the magazine and is provided with a suitable lock or catch 117, which may be of the magnetic type, if desired. A handle 118 is provided at the top of the magazine, since it is contemplated that respective magazines will be changed periodically in the normal course of operation of the device of the invention.

A back panel 119 has two spaced apart tabs 120 and 121 with their outermost edges 122 and 123 turned up and down respectively to form a finger grip which is used to pull the magazine from the compartment 29. To identify the subject matter of a particular film in the magazine, a name plate 124 is placed in some convenient position on the magazine, preferably on the back panel 119 so that it will be legible while several magazines are arranged side-by-side in the compartment 29.

In FIG. 8 there is shown a front closure panel 125 with a lower hook 126 positioned to hook over the lower edge of the opening 104 (FIG. 7) and an upper hook 127 positioned to be received in an opening 128 (FIG. 7). The purpose of the panel 125 is to recover and protect the film exposed through the openings 99 and 104 during transit. A small out-turned flange 129 is formed at the uppermost edge of the panel 125 to serve as a convenient place to grip during removal and mounting of the panel 125.

As best seen in FIG. 9, a small coil spring 130 is interposed between the flange 129 and an extension 131 of the hook 127. A flat projection 132 is formed integrally with the extension 131 and is positioned to be slidable within a slot 133 formed between the front of the magazine 74a and a lip 134.

With the above description of the structure, operation of the hook 127 is believed to be evident. The thumb is placed on the flange 129, and the forefinger is curled under the extension 131. By a squeezing action, the hook 127 is raised vertically, with the projection 132 sliding upwardly in the slot 133. The hook 127 will snap back in place upon releasing the extension 131 due to the action of the coil spring 130.

The back panel 119 actually is formed of two halves, each having a cam surface 119a to displace the panel 119 vertically when the magazine is slid into the compartment 29, and, due to a spring 119b, the panel 119 (FIG. 7A) will hold the magazine in place in the compartment.

Figures 16, 18:
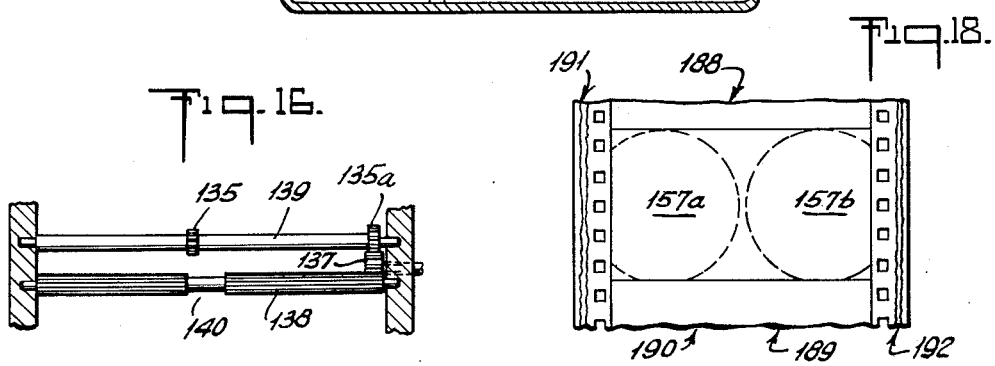
FIG. 16 is a gear system for use in the mechanism as shown in FIG. 15.
FIG. 18 is a view of one frame of a film for use in the apparatus of the invention.

A preferred form of a power attachment to turn the reels 90 and 91, including a rewind feature, is shown in FIG. 15 of the drawings. Referring for the moment to FIGS. 15 and 16, power is supplied by 135, 137 and 138 which moves into meshing engagement so that the gears 135 and 136 mesh. The power source (not shown) may be connected to the gear 137 which meshes with both the gears 135a (fixed to the same shaft 139 as the gear 135) and a rewind gear 138.

The gear 135 is short and is positioned appropriately along its shaft 139 to mesh only with the gear 136 in the particular magazine which is selected and is in position before the lens system. No other magazine in the film compartment can have power connected to it for running a film.

Therefore, power for running the film is supplied from the gear 137, through gear 135a and shaft 139 to gear 135 in mesh with gear 136 which, in turn, meshes through intermediate gears with a geared portion of the roll 95. Any other magazine in the compartment will be connected to the gear 138 for rewind purposes until the rewinding is completed, at which time the power to that magazine is disconnected automatically, as will be explained further presently.

It will be noted that the gear 138 has a blank section 140 adjacent the gear 135. This is to prevent interference with a gear 141 which moves up into mesh with the gear 136 as the reel 90 becomes unwound. Upon completion of a film, i.e., when the reel 90 is unwound, the power to the gear 137 is shut off, and the magazine is shifted automatically within the compartment 29 at least one position.

By shifting the magazine, the gear 136 moves out of mesh with the gear 135, and the gear 141 now moves into mesh with the rewind gear 138. Now, the reel 90 is rewound automatically while another film in another magazine is being viewed, or alternatively, the rewinding of the reel 90 may be initiated by pressing the same button 57, there being a short delay while the reel 90 is rewound. The rewind under this latter condition, however, would be at a much faster rate.

To accomplish the above-described shifting of gears automatically into a rewind condition, the gear 141 is supported rotatably at the end of a lever 142 which is slidable in a constrained path by guides 143 and 144 against the action of a tension spring 145.

Another lever 146 is pivotable at 147. A spring 148 acting on one side of the pivot point 147 maintains a roller 149 at the opposite end of the lever 146 in contact with the film on the reel 90. As the reel 90 becomes unwound, the lever 146 moves to the position indicated by the phantom lines 146a in FIG. 15.

Figure 17:
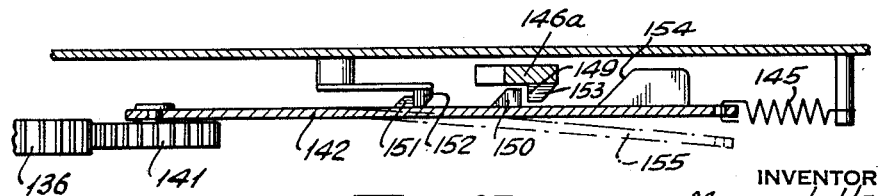
FIG. 17 is a view of a control linkage for operating the rewind mechanism automatically.

As best seen in FIG. 17, the reel 90 is already unwound. The lever 146 has moved to the unwound position indicated by the numeral 146a pushing lever 142 to the left, as viewed in FIG. 17 by the action of the surface 149 abutting against tab 150 until tab 151 snaps over tab 152.

The tab 152 holds the gear 141 in mesh with gear 136 while the reel 90 is being rewound. During this interval, the lever 146 moves to the right, as viewed in FIG. 17, and the cam surface 153 comes to act against a cam surface 154. As the rewinding of the reel 90 reaches completion, the lever 142 is moved outwardly (down as viewed in FIG. 17) to a position indicated by the phantom lines 155, at which point the tab 151 slips from behind the tab 152 and the spring 145 returns the lever 142 to its retracted position.

Thus, the gear 141 is retracted from the gear 138 automatically when the rewind operation is completed. Of course, it is understood that the power attachment to each magazine may be as described above, or it may be arranged otherwise as desired.

A gate front and film pull-down attachment 156 is advanced into position along with the power attachment 84, the gate-opening plunger 83, and the sound pick-up head 113 upon the energization of a solenoid (not shown). Upon completion of a film, these elements are retracted to permit the shifting of film magazines.

Referring now to the optical system of the invention as illustrated in FIG. 10 of the drawings, it is assumed for the purposes of this illustration that the light rays, after reflection by the gate 82, pass in relatively straight lines to the observer, which would be the case for an apparatus constructed for use by a single individual only. It has been explained previously that a reflector arrangement 11, FIG. 1, will be used for viewing by more than a single individual.

The light that is reflected by the gate 82 passes through the film 92 to provide the image for viewing. Each frame of the film 92, as seen in FIG. 18, has two images 157a and 157b, since in accordance with the invention these images or portions of a scene which are not seen by an observer are eliminated from the film.

Due to the location of the nose between the eyes of most humans, the right eye, for example, cannot see as far to the left as it can to the right, and the left eye cannot see past the nose at the right but it can see much further to the left. This is illustrated by the eyes 158 and 159 of an observer at the bottom of FIG. 10 where it is shown that the two innermost edges of the separate image beams 160 and 161 do not reach around as far within each eye as do the outermost edges of the beams.

In accordance with the invention, therefore, the rims of the eye piece lenses 36a and 36b are cut off at the portions 162 and 163 adjacent each other. The space provided by the cut off portions 162 and 163 permit the eye pieces 36a and 36b to fit on each side of an observer's nose, and the eye pieces 36a and 36b are dimensioned appropriately to fit beneath the brow of an observer and somewhat into the observer's eye socket.

Due to the concave nature of the eye pieces 36a and 36b, sufficient space is available for the eye lashes of an observer so that the lenses fit comfortably close to the eyes 158 and 159. It will be noted, therefore, that the eye piece lenses 36a and 36b substantially cover the entire peripheral range of an observer's vision.

Lenses which transmit reasonably sharp images at an angle of 160 degrees to 180 degrees are available as such. However, one of the major disadvantages of such lenses is that they develop very bad spherical or "barrel" distortion. This is apparent by looking at images either directly through the film negative or through any conventional projection device at an oblique angle.

If now, however, the eye is positioned substantially on the central optical axis of the image and view the image directly or through a suitable enlarging lens, the image will appear without spherical distortion. This is so because the viewing eye is on the same optical axis which was used to make the film negative initially, and the image falls on the eye's retina in the same place that it would fall if the eye were looking at the real object itself.

For the above principle to work with maximum effect especially for scenes that fill an arc of approximately 180 degrees, the viewing lens or eyepiece must have a particular configuration. Its back surface must be concave so that it can surround the cornea of the eye, especially on the outer lateral side nearest the ear, and its front surface must be semispherical to maximize the diffracting power of the lens closest to the eye. Furthermore, the edges of the lenses must be trimmed in a particular way to allow the lenses to pass the obstacles of the nose bridge and brow to come as close as possible to the cornea.

As seen in FIG. 10, the lenses 36a and 36b bend the light rays coming from the film in such a way that they enter the cornea from the sides and, consequently, hit the nerves on the sides of the retina as well as the back. This gives the viewer the illusion of being entirely surrounded by the image, just as in real life, and there is no "window effect" or distracting side lights developed.

Additional lenses 164 and 165 are used in conjunction with the peripheral vision lenses 36a and 36b when it is desired to focus on a smaller picture which must be brought closer to the eye in order for it to entirely fill the 180 degree image area on the retina. It should be noted, also, that the picture on the negative itself can be trimmed horizontally and vertically in the taking and viewing to correspond to what each respective eye can normally see, i.e., 140–150 degrees horizontally and 150 degrees vertically, and this will be discussed in more detail in connection with FIG. 18 presently.

The two prismatic lenses 85 in FIG. 10 have been described already as being for the purpose of separating the two images for correct entrance into the respective eyes, and the resolving lenses 86 reestablish any possible deviation from parallelism which the light rays may have developed. The lenses 40a and 40b are each pivotable to present the respective images centrally to each respective eye, and these lenses are selectably pivotable by the arrangement described previously and shown in FIG. 2.

Figure 11:
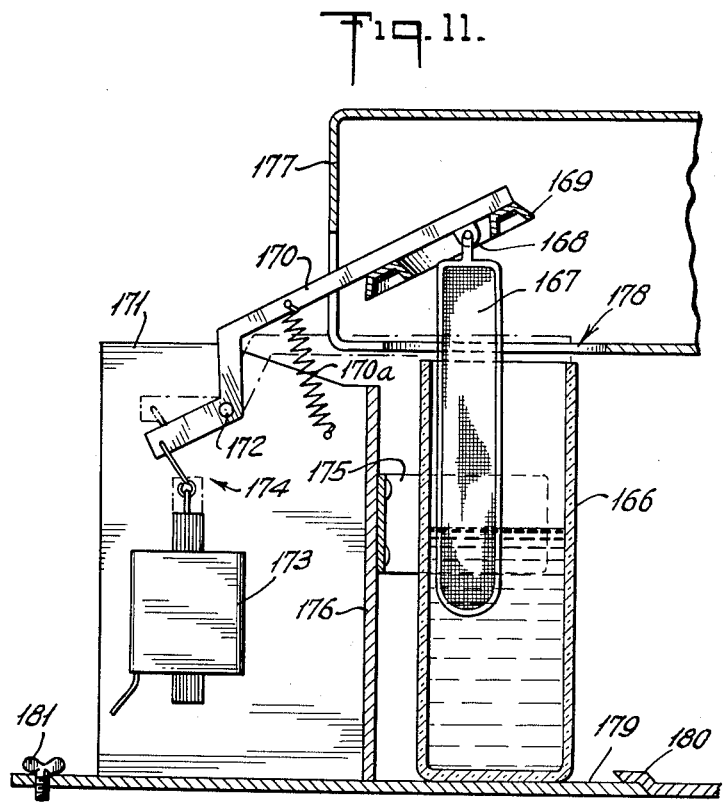
FIG. 11 is a side view partly in section showing one arrangement for enclosing an odor-stimulating substance for release into the hood.

In accordance with the invention, suitable odors or scents are emitted at preselected intervals as required by the particular subject matter being viewed. As seen in FIG. 11 of the drawings, a source of a selected odor is contained in a vessel 166, and a wick 167 is inserted through an opening in the upper end of the vessel. One end of the wick 167 is attached by a link 168 to a lid 169 which is dimensioned appropriately to close the opening in the vessel 166.

An arm 170 is pivotably mounted to a substantially vertical wall or partition 171 by a pin 172 so that energization of an electromagnet 173 will pivot the arm 170 by means of a suitable interconnecting linkage 174 attached to the opposite end of the arm 170 from the lid 169. Upon deenergization of the electromagnet 173, the lid is returned to close the vessel 166 either by a spring about the pin 172, a spring 170a connected between the arm 170 and the partition 171, by the weight of the lid and wick alone, or by any other suitable means.

The vessel 166 is removably held in place by a clamp 175 attached to another wall or partition 176 extending in a direction substantially perpendicular to the partition 171. A tunnel 177 is positioned just above the vessel 166, and an opening 178 in the tunnel 177 receives the arm 170, lid 169 and a portion of the wick 167 when the electromagnet 173 is energized. By this arrangement, the wick 167 is raised into the tunnel 177 so that the odor contained in the vessel 166 may be conveyed to the respective canopies.

Figure 12:
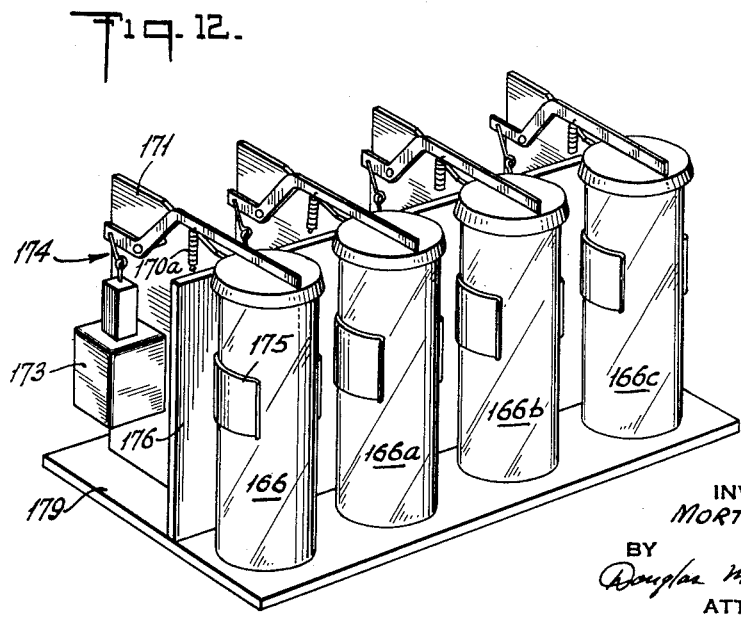
FIG. 12 is a view in perspective showing an arrangement for a plurality of odor-stimulating substance containers for use with an arrangement as shown in FIG. 11.

There are any desired number of the vessels 166 such as seen in FIG. 12 of the drawings and indicated by the numerals 166, 166a, 166b and 166c. Each vessel contains a source of an odor, and a desired vessel is selected by an electrical signal in a track on the particular film being viewed. The electrical signal, in turn, is used to select and to actuate one of the electromagnets 173. The selection of a desired electromagnet may be by varying pulse magnitudes, varying pulse widths, varying number of pulses, or any other suitable means.

Figure 14:
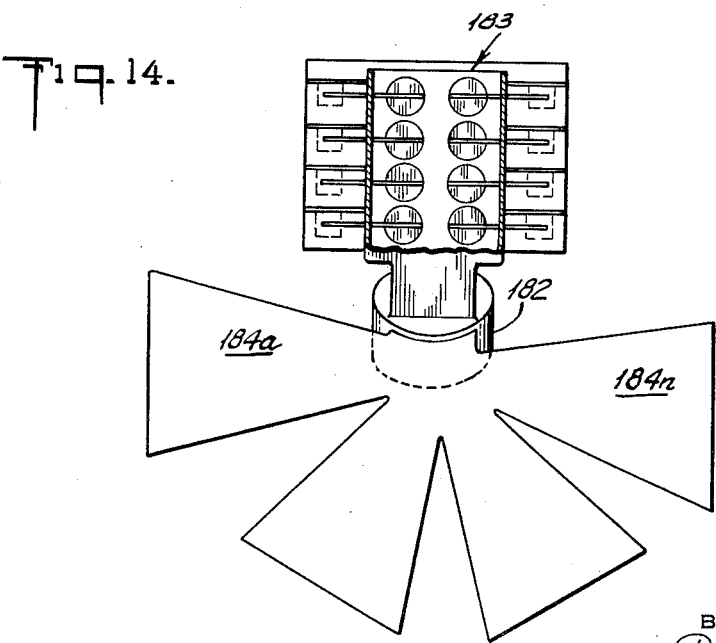
FIG. 14 is a plan view of the breeze developing arrangement shown in FIG. 13.

A desired number of the vessels are ganged together on a common board or support 179, and any number of these boards are associated with the tunnel 177, as illustrated in FIG. 14. It is preferred that the board or support 179 be readily removable to permit changing or adding more odor fluid to the vessels. As seen in FIG. 11, the board is hooked along one edge beneath a hook 180 and is held down along the opposite edge by bolts such as indicated by the numeral 181.

Figure 13:
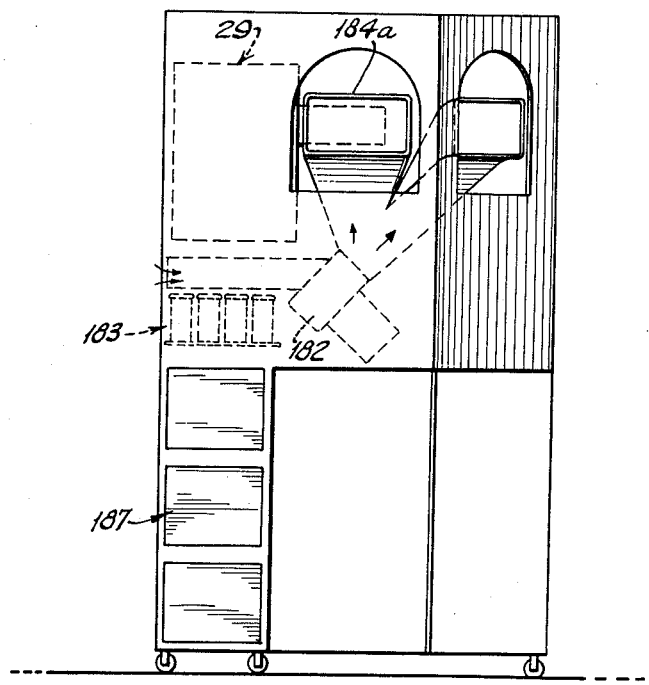
FIG. 13 is a side view in elevation of a breeze developing arrangement.

The FIGS. 13 and 14 are included in the drawings to illustrate the interconnection of the odor arrangement with the overall structure of the invention. For example, the source of the odors is located, according to one form of the invention, just beneath the compartment 29, and a blower 182 draws air through the tunnel from the rear 183 across the various vessels and directs the air flow through various ducts 184a . . . 184n to respective canopy openings such as identified by the numerals 185 and 186 in FIG. 3 and FIG. 4.

Also illustrated in FIG. 13 is the position of the various electrical component parts to synchronize and operate the respective units together as will be readily provided by one skilled in the art. The positions of such electrical parts is indicated by the numeral 187.

Referring now to one frame 188 of the film as seen in FIG. 18 of the drawings, the frame is divided into a right half 189 and a left half 190 with a track between the two halves, if desired, or the preferred form is without such a track as shown in FIG. 18. There are a number of tracks on the left edge and on the right edge of the film as seen by the numerals 191 and 192 in FIG. 18.

The tracks 191 may be used, for example, to store two binaural sound tracks, and the tracks 192 may be used to store signals to control the breeze and odor arrangement and the vibration unit. Of course, any other signal storage arrangement may be provided as desired.

Both halves of the frame are exposed through suitable lens (not shown) but may be similar to the lens system shown in FIG. 10, and each half of each frame is exposed only to that portion of a scene that an eye would actually see. This is illustrated in FIG. 18 by the cut off portion at the bottom and outside edges of each half of the frame. For example, since each image is inverted and reversed (see FIG. 10), the cut off portion along the right edge of the frame is that portion that would be blocked by the nose, and the portion cut off by the brow. Therefore, in accordance with the invention, more details of a particular scene may be obtained in each frame and the vision is extended accordingly.

While there has been shown and described and pointed out the fundamental novel features of the invention as applied to a preferred embodiment, it will be understood that various omissions, substitutions and changes in the form and details of the device illustrated, and in its operation may be made by those skilled in the art without departing from the spirit of the invention.

I claim:

1. In a simulator apparatus, housing means, hood means mounted on said housing means to fit about the head of an observer, visual image projection means supported by said housing means, optical means to direct visual images from said projection means to said hood means, said optical means including eye pieces adapted to fit relatively close to the eyes of an observer to provide a 3–D effect with complete peripheral vision, means associated with said housing means to direct a breeze toward said hood means, means to enclose an odor-sense stimulating substance for release into said hood means, and means to coordinate said breeze directing means and said odor whereby the cooperative effects of said breeze, said odor and said visual images stimulate a desired sensation in an observer.

2. In a simulator apparatus, housing means, hood means mounted on said housing means to fit about the head of an observer, visual image projection means supported by said housing means, optical means to direct visual images from said projection means to said hood means, said optical means including eye pieces adapted to fit relatively close to the eyes of an observer to provide a 3–D effect with complete peripheral vision, means associated with said housing means to direct a breeze toward said hood means, means to enclose an odor-sense stimulating substance for release into said hood means, means to coordinate said breeze directing means and said odor whereby the operative effects of said breeze, said odor and said visual images stimulate a desired sensation in an observer, and vibrator means to induce vibrations in an observer in timed response to said means to coordinate.

3. In a simulator apparatus as set forth in claim 2 wherein said means to coordinate includes a multitrack film.

4. In a simulator apparatus as set forth in claim 2 including separate audio means within said hood means to develop stereo sound effects.

5. In a simulator apparatus as set forth in claim 2 including seat means separate from said housing means, and said means to induce vibrations is attached only to said seat means.

6. In a simulator apparatus as set forth in claim 2 including light means within said hood means to aide an observer in locating positions of objects within said hood means.

7. In a simulator apparatus, housing means, hood means supported by said housing means to fit about the head of an observer, a plurality of separate film magazines, means to select one of said film magazines automatically, projection means to operate with only the selected film magazine, optical means to direct visual images from the selected film magazine to said hood means, said optical means including eye pieces adapted to fit relatively close to the eyes of an observer to provide a 3–D effect with complete peripheral vision, means associated with said housing means to direct a breeze toward said hood means, means to enclose an odor-sense stimulating substance for release into said hood means, and means to coordinate said breeze directing means and said odor whereby the cooperative effects of said breeze, said odor and said visual images stimulate a desired sensation in an observer.

8. In a simulator apparatus as set forth in claim 7 wherein each of said film magazines includes automatic film rewind means.

9. In a simulator apparatus as set forth in claim 7 wherein a closure gate means is mounted within each of said film magazines to normally close a film projection opening, said mount means being adapted to permit said gate means to pivot, and one surface of said gate means being light reflective.

10. In a simulator apparatus as set forth in claim 7 wherein each of said film magazines includes means to detachably connect a source of film-running power.

11. In a simulator apparatus as set forth in claim 7 wherein said means to enclose an odor includes means to release an odor in response to a preselected signal.

12. In a simulator apparatus as set forth in claim 7 wherin the film in each of said magazines includes individual frames which are divided into two portions, one of said portions being exposed only to that part of a scene normally viewed by only one eye of an observer, and the other of said portions being exposed only to that part of a scene normally viewed by only the other eye of an observer.

13. An optical system to create three-dimensional visual effects comprising means to project an image substantially along a predetermined axis, and eye-piece lenses each having a convex surface on the side facing the projecting image means with its center of curvature in the vicinity of the opposite surface and the opposite surface being curved concavely with a radius of curvature that is longer than the radius of curvature of the first-mentioned surface and the eye-piece lenses being adapted to fit relatively close to the eyes of an observer to provide substantially complete peripheral vision.

(References on following page)

References Cited in the file of this patent

UNITED STATES PATENTS

| | | |
|---|---|---|
| 1,543,188 | Poser | June 23, 1925 |
| 1,749,187 | Leavell | Mar. 4, 1930 |
| 1,789,680 | Gwinnett | Jan. 20, 1931 |
| 1,806,190 | Arfsten | May 19, 1931 |
| 2,410,725 | Franklin | Nov. 5, 1946 |
| 2,522,938 | Francis et al. | Sept. 19, 1950 |
| 2,562,959 | Stern | Aug. 7, 1951 |
| 2,562,960 | Stern | Aug. 7, 1951 |
| 2,813,452 | Laube | Nov. 19, 1957 |
| 2,861,806 | Disney | Nov. 25, 1958 |